United States Patent [19]

Paddock et al.

[11] Patent Number: 5,797,054
[45] Date of Patent: Aug. 18, 1998

[54] THREE AXIS GIMBAL FOR USE IN A CAMERA SUPPORT SYSTEM

[76] Inventors: George K. Paddock; Christopher C. Haarhoff, both of 6040 Rodgerton Rd., Los Angeles, Calif. 90068

[21] Appl. No.: 488,856

[22] Filed: Jun. 9, 1995

[51] Int. Cl.[6] .................... G03B 29/00; G03B 17/00; G03B 21/00
[52] U.S. Cl. .................... 396/421; 396/428; 352/243
[58] Field of Search .................... 352/243; 354/81, 354/82; 396/421, 428; 285/265

[56] References Cited

U.S. PATENT DOCUMENTS

| | | | |
|---|---|---|---|
| 3,596,934 | 8/1971 | DeCenzo | 285/165 |
| 4,139,221 | 2/1979 | Shotbolt | 285/18 |
| 4,158,488 | 6/1979 | Gottschalk et al. | 352/243 |
| 4,427,218 | 1/1984 | Duvet et al. | 285/184 |
| 4,976,387 | 12/1990 | Spianti | 224/262 |
| 5,435,515 | 7/1995 | DiGiulio | 248/576 |

*Primary Examiner*—Michael L. Gellner
*Assistant Examiner*—Daniel Chapik
*Attorney, Agent, or Firm*—W. Edward Johansen

[57] ABSTRACT

A three axis gimbal for use in a motion picture camera support system including a support apparatus and a combined sled and camera having a postphotography. By using the three axis gimbal an operator can adequately control angular deviations of the combined sled and camera along the axes of pan, roll and tilt during hand-held motion picture photography.

2 Claims, 3 Drawing Sheets

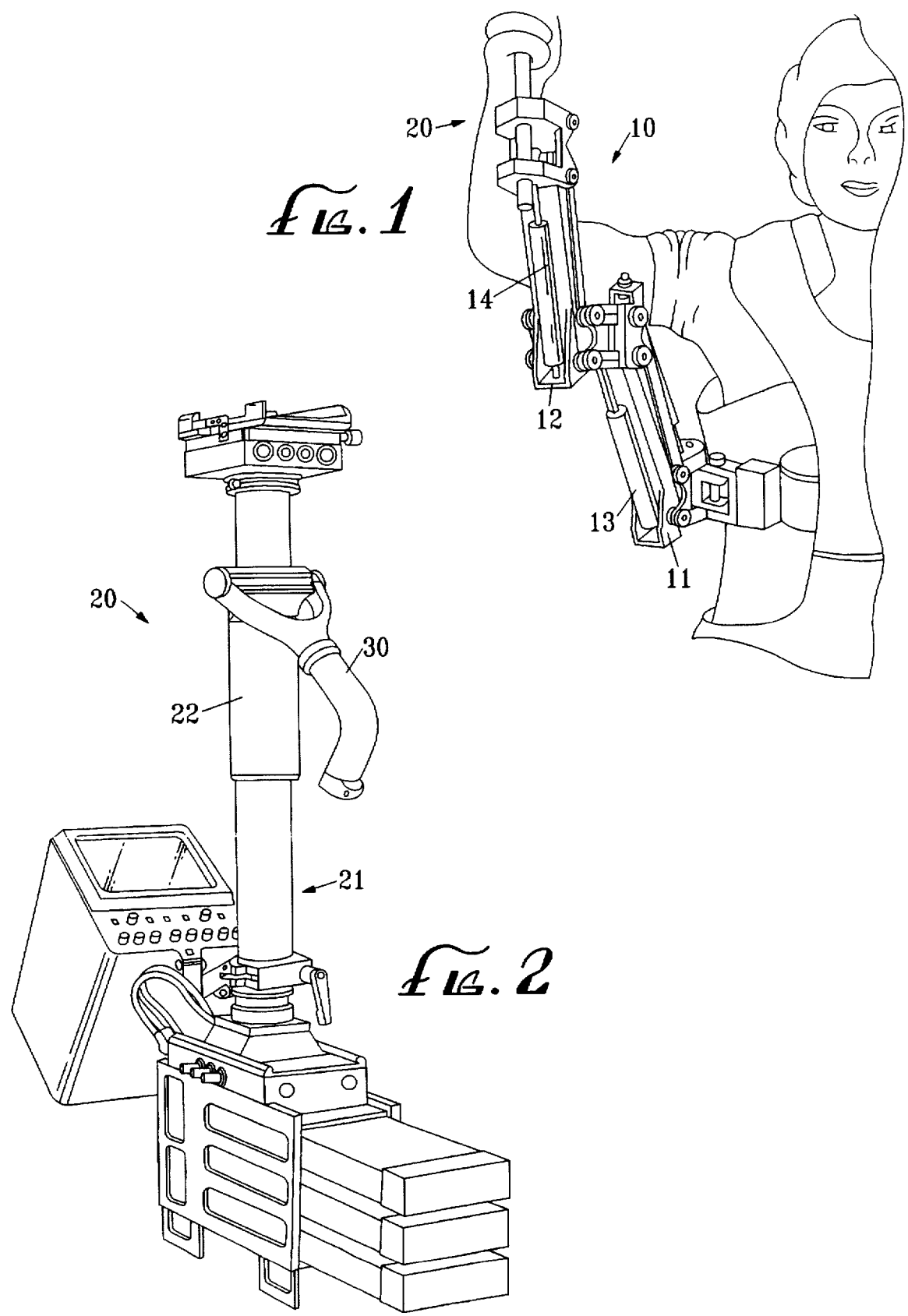

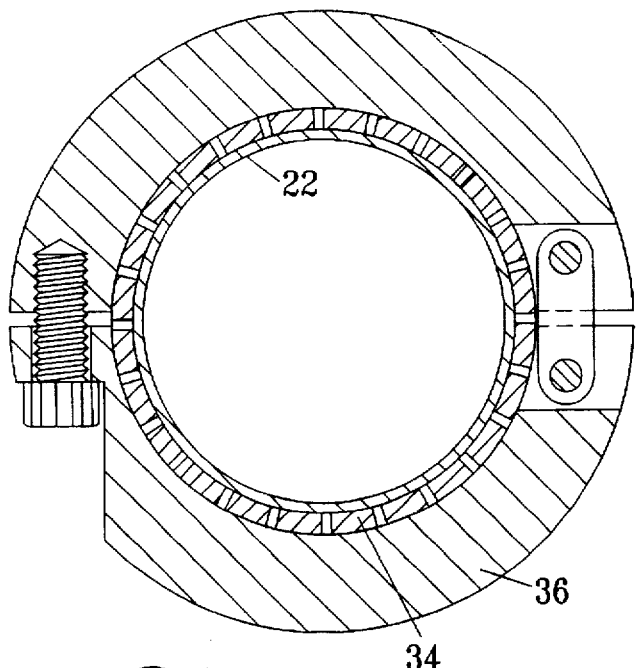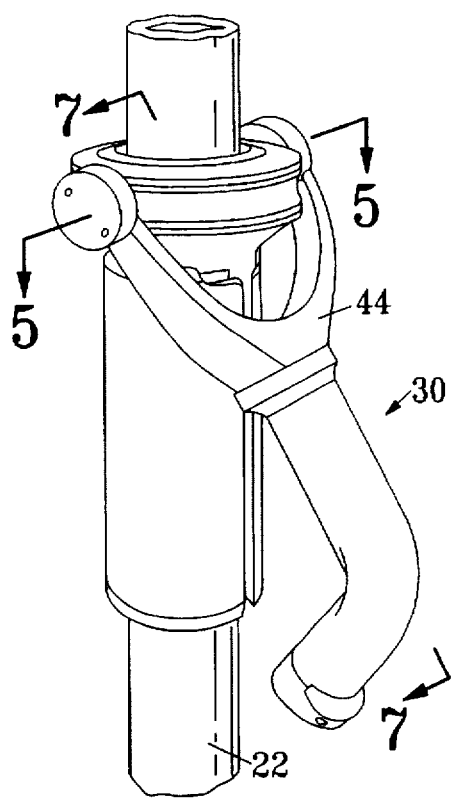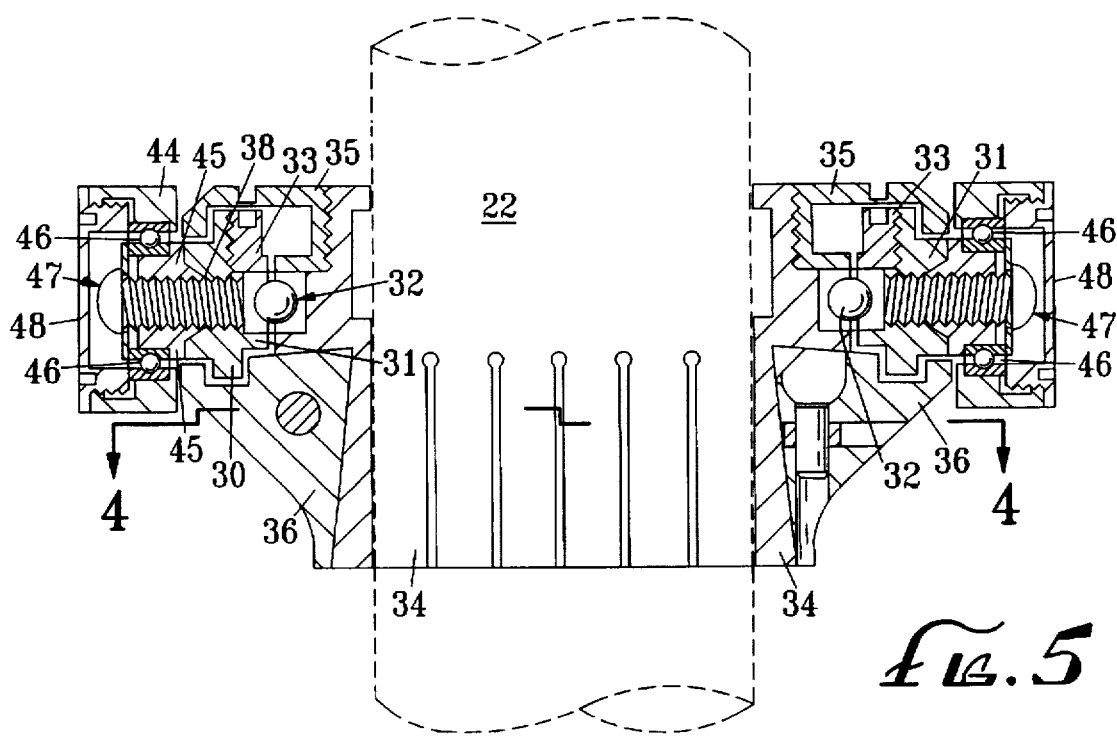

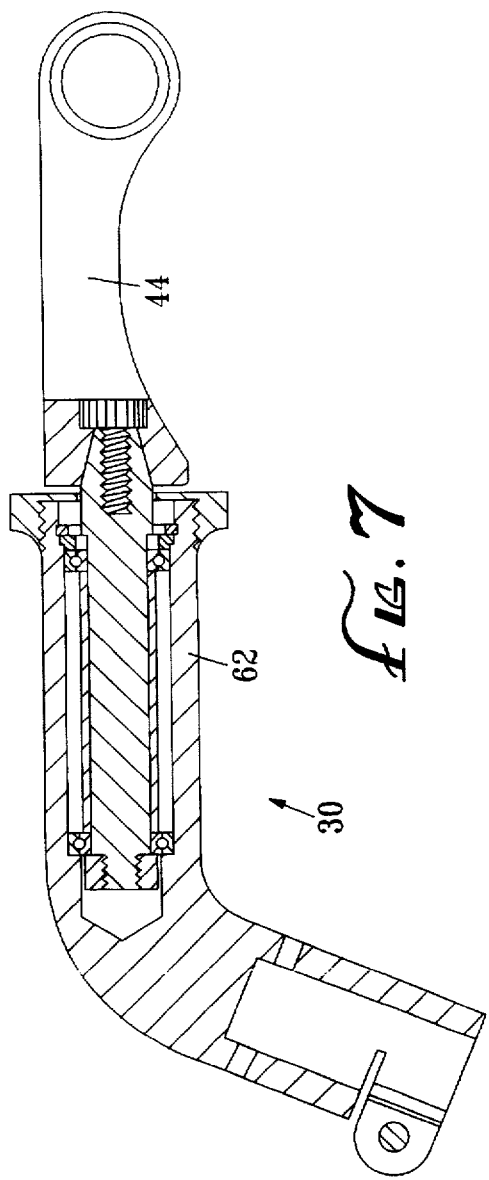
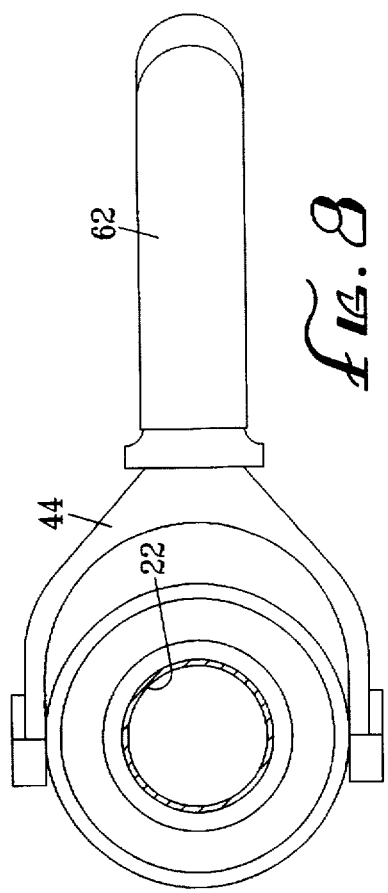
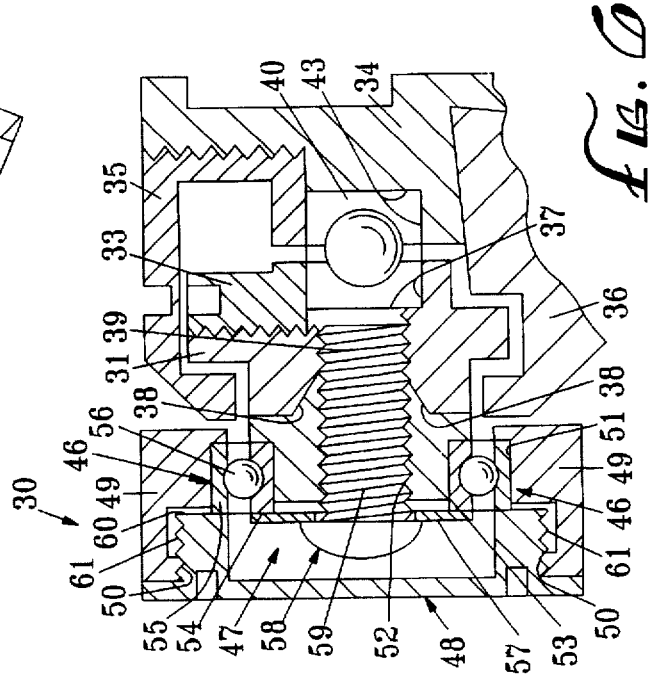

5,797,054

THREE AXIS GIMBAL FOR USE IN A CAMERA SUPPORT SYSTEM

BACKGROUND OF THE INVENTION

The invention relates to a three axis gimbal for use in a camera support system for a motion picture camera.

In making a motion picture with a motion picture camera it is extremely important that the motion picture camera be maintained in as stable a position as possible in order to obtain high quality results. Such stability has been achieved by mounting the motion picture camera on a tripod which supports the motion picture camera on a stationary support so as to eliminate any possibility of undesirable camera motion. Problems arise when it is desired to take motion pictures under conditions wherein it is necessary or desirable that the camera itself be mobile. The motion picture camera may be mounted on a wheeled dolly running on temporary tracks. When it has been necessary or desirable to employ a hand-held motion picture camera, high quality results have generally been unobtainable when the cameraman walks or runs with the motion picture camera because of the attendant increase in instability, namely the quick angular deviations along the axes of pan, roll and tilt which the cameraman can not adequately control. Such instability has heretofore been characteristic of hand-held motion picture photography.

U.S. Pat. No. 4,394,075 teaches a support apparatus which includes a support vest, a first rotatably interconnected arm having a first end and a second end, a second rotatably interconnected arm having a first end and a second end, a first spring mechanism and a second spring mechanism. The first end of the first rotatably interconnected arm is rotatably and pivotably coupled to the support vest worn by an operator. The first end of the second rotatably interconnected arm is rotatably and pivotably coupled to the second end of the first rotatably interconnected arm. The second end of the second rotatably interconnected arm is arranged and configured to support the portable camera. The first and second spring mechanisms are coupled to the first and second rotatably interconnected arms, respectively, in order to compensate for the weight to each end of the rotatably interconnected arms. In operation a weight mounted on the support apparatus is spatially decoupled from the operator. The position of the weight is not affected by motion of the operator.

U.S. Pat. No. 4,017,168 teaches a camera support system which enables a mobile photographer to take high quality, ambulatory hand-held photographs with a motion picture camera. The camera support system includes a support apparatus, a combined sled and portable camera which has the mass of the combined sled and camera distributed at points which are remote from each other about a handle in a manner so that the handle is located at approximately the center of the moment of inertia of the combined sled and portable camera. By employing the combined sled and camera the camera support system increases inherent stability in a manner which permits a cameraman to obtain high quality results when utilizing hand-held equipment. The support apparatus permits the combined sled and camera to float freely in a manner to isolate the motion picture camera from any movement of the cameraman.

SUMMARY OF INVENTION

The present invention is generally directed to a three axis gimbal for use in a camera support system including a support apparatus and a combined sled and camera having a post. The camera is a motion picture camera. The three axis gimbal has a first axis, which is the pan axis, a second axis, which is the roll axis, and a third axis, which is the tilt axis.

In a first separate aspect of the present invention, the three axis gimbal includes a ring, a collet and a clamp ring. The collet is axially aligned with an outer bearing surface of the ring and is disposed around the post. The inner race of the bearing assembly is disposed in and coupled to an inner bearing surface of the collet. The clamp ring is disposed around and floatingly coupled to the collet and fixedly couples the collet to the post. The three axis gimbal is rotatively coupled to the post about a first axis. The collet maintains its axial alignment about the first axis within a very close tolerance.

In a second separate aspect of the present invention, the three axis gimbal includes a ring having a pair of trunnion mounts, a yoke with two arms each of which having an outer bearing surface, a pair of trunnions each of which having an inner bearing surface, a pair of bearing assemblies, a pair of inner race retainers and a pair of caps. Each bearing assembly is disposed in and coupled to one of the trunnions. Each inner race retainer engages the inner race of one of the bearing assemblies to secure the inner race. Each cap engages the outer race of one of the bearing assemblies to secure the outer race. The ring maintains its axial alignment along the first axis within a very close tolerance.

In a third separate aspect of the present invention, the use of the three axis gimbal enables the first, second and third axes to intersect at a common point so that angular deviations of the combined sled and camera along the axes of pan, roll and tilt can be adequately controlled during hand-held motion picture photography.

Other aspects and many of the attendant advantages will be more readily appreciated as the same becomes better understood by reference to the following detailed description and considered in connection with the accompanying drawing in which like reference symbols designate like parts throughout the figures.

The features of the present invention which are believed to be novel are set forth with particularity in the appended claims.

BRIEF DESCRIPTION OF THE DRAWING

FIG. 1 is a perspective drawing of a support apparatus including a support vest, a first rotatably interconnected arm and a second rotatably interconnected arm according to U.S. Pat. No. 4,394,075.

FIG. 2 is a perspective drawing of a combined sled and camera which includes a post and a three axis gimbal according to the invention.

FIG. 3 is a perspective drawing of the post and the three axis gimbal of FIG. 2 which includes a ring, a yoke and a handle with the post rotating within the ring along a first axis and the ring pivoting on the yoke about a second axis.

FIG. 4 is a transverse cross-sectional view of the three axis gimbal of FIG. 2 taken along the line 4—4 of FIG. 5.

FIG. 5 is a side elevational view in cross-section of the three axis gimbal of FIG. 2 taken along the line 5—5 of FIG. 3.

FIG. 6 is an enlarged partial side elevational view in cross-section of the three axis gimbal of FIG. 2 taken along the line 5—5 of FIG. 3.

FIG. 7 is a longitudinal cross-sectional view of the yoke and the handle of FIG. 2 taken along the line 7—7 of FIG. 3 with the yoke rotating about the handle along a third axis.

FIG. 8 is a top plan view in cross-section of the post and the three axis gimbal of FIG. 2 with the post being disposed orthogonally to the handle and the yoke of the three axis gimbal being rotated ninety degrees about the handle along the third axis.

DESCRIPTION OF THE PREFERRED EMBODIMENT

Referring to FIG. 1 in conjunction with FIG. 2 a support apparatus 10 includes a support vest 11, a first rotatably interconnected arm 12 having a first end and a second end, a second rotatably interconnected arm 13 having a first end and a second end, a first spring mechanism 14 and a second spring mechanism 15. The first end of the first rotatably interconnected arm 12 is rotatably and pivotably coupled to the support vest 11 worn by an operator. The first end of the second rotatably interconnected arm 13 is rotatably and pivotably coupled to the second end of the first rotatably interconnected arm 12. The first and second spring mechanisms 14 and 15 are coupled to the first and second rotatably interconnected arms 12 and 13, respectively, in order to compensate for the weight to each end of the rotatably interconnected arms 12 and 13.

Still referring to FIG. 1 in conjunction with FIG. 2 a camera support system 20 enables a mobile photographer to take high quality, ambulatory hand-held photographs with a motion picture camera. The camera support system 20 includes the support apparatus 10, a combined sled and camera (not shown) 21 which has a post 22. The second end of the second rotatably interconnected arm 13 is arranged and configured to support the combined sled and camera 21. The mass of the combined sled and camera (not shown) 21 is distributed at points which are remote from each other about a handle in a manner so that the handle is located at approximately the center of the moment of inertia of the combined sled and portable camera (not shown) 21. By employing the combined sled and camera 21 the camera support system 20 increases inherent stability in a manner which permits a cameraman to obtain high quality results when utilizing hand-held equipment. The support apparatus 10 permits the combined sled and portable camera (not shown) 21 to float freely in a manner to isolate the camera from any movement of the cameraman.

Referring to FIG. 3 in conjunction with FIG. 4 and FIG. 5 a three axis gimbal 30 is rotatively coupled to the post 22 about a first axis. The first axis is the pan axis. The three axis gimbal 30 includes a ring 31, a first bearing assembly 32, an outer race retainer 33, a collet 34, an inner race retainer 35 and a clamp ring 36. The collet 34 includes a rigid collar 34a and a radially compressible skirt 34b which are axially fixed together. The ring 31 has an outer bearing surface 37 and a pair of trunnion mounts 38. Each trunnion mount 38 has a threaded bore 39 of a first diameter. The ring 31 is axially aligned about the first axis and the threaded bores 39 are axially aligned along a second axis.

Referring to FIG. 3 in conjunction with FIG. 5 and FIG. 6 the first bearing assembly 32 includes an inner race 40, an outer race 41 and a plurality of ball bearings 42. The ball bearings 42 couple the inner race 40 to the outer race 41. The outer race 41 is disposed in and coupled to the outer bearing surface 37 of the ring 31. The outer race retainer 33 is axially aligned with and threadedly coupled to the ring 31. The outer race retainer 33 secures the outer race 41 of the first bearing assembly 32. The collet 34 has an inner bearing surface 43 which is axially aligned with the outer bearing surface 37 of the ring 31. The inner race retainer 35 is axially aligned with and threadedly coupled to the collet 34. The inner race retainer 35 secures the inner race 40 of the first bearing assembly 32 to the inner bearing surface 43 of the collet 34.

Referring to FIG. 4 in conjunction with FIG. 3 and FIG. 5 the clamp ring 36 is disposed around the collet 34. The collet 34 is disposed around the post 22 and is floatingly coupled to the collet 34. The inner race 40 of the first bearing assembly 32 is disposed in and coupled to the inner bearing surface 43 of the collet 34. The clamp ring 36 is not fixedly coupled to the collet 34 so the clamp ring 36 does not cause the inner bearing surface 43 of the collet 34 to move off the first axis. The clamp ring 36 fixedly couples the collet 34 to the post 22 so that the collet 34 maintains its axial alignment about the first axis within a very close tolerance.

Referring to FIG. 5 in conjunction with FIG. 3 and FIG. 6 the three axis gimbal 30 also includes a yoke 44, a pair of trunnions 45, a pair of second bearing assemblies 46, a pair of inner race retainers 47 and a pair of caps 48. The yoke 44 has two arms 49. Each arm 49 has a threaded bore 50 of a second diameter and an outer bearing surface 51. The second diameter is larger than the first diameter. The outer bearing surface 51 is axially aligned with the first axis when each arm 49 is disposed adjacent to one of the trunnion mounts 38. Each trunnion 45 has a bore 52 of the first diameter. Each trunnion 45 is axially aligned with the first axis and has an inner bearing surface 53 which is axially aligned with the first axis. Each trunnion 45 is coupled to one of the trunnion mounts 38 of the ring 31. Each second bearing assembly 46 includes an inner race 54, an outer race 55 and a plurality of ball bearings 56 coupling the inner race 54 to the outer race 55. The inner race 54 of each second bearing assembly 46 is disposed in and coupled to one of the trunnions 45. The outer race 55 of each second bearing assembly 46 is disposed in and coupled to the outer bearing surface 51 of one of the arms 49 of the yoke 44. Each inner race retainer 47 includes a washer 57 and a screw 58 which is of the first diameter and has a threaded shaft 59. The shaft 59 of the screw 58 extends through the bore 52 of one of the trunnions 45 and is threadedly coupled to the threaded bore 39 of one of the trunnion mounts 38. The washer 57 of each inner race retainer 47 engages the inner race 54 of one of the second bearing assemblies 46 to secure the inner race 54. Each cap 48 has an inner flat surface 60 and a threaded shaft 61. The threaded shaft 61 of the cap 48 is threadedly coupled to the threaded bore 50 of one of the arms 49 of the yoke 44. Each cap 48 is axially aligned with one of the trunnions 45. Each cap 48 engages the outer race 55 of one of the second bearing assemblies 46 to secure the outer race 55. The ring 31 of the three axis gimbal 30 is pivotally coupled to the arms 49 of the yoke 44 about a first axis. The ring 31 maintains its axial alignment along the second axis within a very close tolerance. The second axis is the roll axis. The first and second axes are orthogonal and intersect each other at a common point.

Referring to FIG. 7 in conjunction with FIG. 3 the three axis gimbal 30 further includes a handle 62. The handle 62 is rotatively coupled to the yoke 44 about a third axis and detachably coupled to the support apparatus 10. The third axis is the tilt axis.

Referring to FIG. 8 in conjunction with FIG. 7 when the post 22 is disposed orthogonally to the handle 62 and the yoke 44 of the three axis gimbal 30 has been rotated ninety degrees about the handle 62 along the third axis there is no movement of the yoke 44 off the second axis. This allows the first, second and third axes to not only remain orthogonal to each, but also to intersect each other at a common point so that a cameraman can adequately control angular deviations of the combined sled and camera 20 along the axes of pan, roll and tilt during hand-held motion picture photography.

From the foregoing it can be seen that a three axis gimbal has been described. It should be noted that the sketches are not drawn to scale and that distance of and between the figures are not to be considered significant.

Accordingly it is intended that the foregoing disclosure and showing made in the drawing shall be considered only as an illustration of the principle of the present invention.

What is claimed is:

1. A gimbal for use with a post, said gimbal comprising:
   a. an inner gimbal ring having an outer bearing surface;
   b. a bearing assembly including an inner race, an outer race and a plurality of ball bearings coupling said inner race to said outer race wherein said outer race is disposed in and coupled to said outer bearing surface of said inner gimbal ring;
   c. an outer race retainer axially aligned with and threadedly coupled to said inner gimbal ring whereby said outer race retainer secures said outer race of said bearing assembly;
   d. a collet, including a rigid collar and a radially compressible skirt axially fixed together, having an inner bearing surface which is axially aligned with said outer bearing surface of said inner gimbal ring, said collet being disposed around the post and said collet being positionable on the post wherein said inner race of said bearing assembly is disposed in and coupled to said inner bearing surface of said collet;
   e. an inner race retainer axially aligned with and threadedly coupled to said collet whereby said inner race retainer secures said inner race of said bearing assembly to said inner bearing surface of said collet; and
   f. a clamp ring disposed around and coupled to said radially compressible skirt of said collet, said clamp ring fixedly coupling said collet to the post whereby said gimbal is rotatively coupled to the post about a first axis and whereby said rigid collar of said collet maintains its axial alignment about said first axis within a very close tolerance.

2. A three axis gimbal for use in a camera support system including a support apparatus and a combined sled and camera having a post, said three axis gimbal comprising:
   a. an inner gimbal ring having an outer bearing surface and a pair of trunnion mounts each of which having a threaded bore of a first diameter, said inner gimbal ring being axially aligned about a first axis which is the pan axis, said threaded bores being axially aligned along a second axis which is the roll axis whereby said first and second axes are orthogonal and intersect each other;
   b. a first bearing assembly including an inner race, an outer race and a plurality of ball bearings coupling said inner race to said outer race wherein said outer race is disposed in and coupled to said outer bearing surface of said inner gimbal ring;
   c. an outer race retainer axially aligned with and threadedly coupled to said ring whereby said outer race retainer secures said outer race of said first bearing assembly;
   d. a collet, including a rigid collar and a radially compressible skirt axially fixed together, having an inner bearing surface which is axially aligned with said outer bearing surface of said inner gimbal ring, said collet being disposed around the post and said collet being positionable on the post wherein said inner race of said bearing assembly is disposed in and coupled to said inner bearing surface of said collet;
   e. an inner race retainer axially aligned with and threadedly coupled to said collet whereby said inner race retainer secures said inner race of said bearing assembly to said inner bearing surface of said collet;
   f. a clamp ring disposed around and coupled to said radially compressible skirt of said collet, said clamp ring fixedly coupling said collet to the post whereby said gimbal is rotatively coupled to the post about a first axis and whereby said rigid collar of said collet maintains its axial alignment about said first axis within a very close tolerance;
   g. a yoke with two arms each of which having a threaded bore of a second diameter, which is larger than said first diameter, and an outer bearing surface which is axially aligned with said second axis when each of said arms is disposed adjacent to one of said trunnion mounts;
   h. a pair of trunnions each of which having a bore of said first diameter axially aligned with said second axis and having an inner bearing surface which is axially aligned with said second axis, each of said trunnions being coupled to one of said trunnion mounts of said inner gimbal ring;
   i. a pair of bearing assemblies each of which including an inner race, an outer race and a plurality of ball bearings coupling said inner race to said outer race wherein said inner race of each of said bearing assemblies is disposed in and coupled to one of said trunnions and wherein said outer race of each of said bearing assemblies is disposed in and coupled to said outer bearing surface of one of said arms of said yoke;
   j. a pair of inner race retainers each of which including a washer and a screw having a threaded shaft of said first diameter extending through said bore of one of said trunnions and being threadedly coupled to said threaded bore of one of said trunnion mounts wherein each of said inner race retainers engages said inner race of one of said bearing assemblies to secure said inner race;
   k. a pair of caps each of which having an inner flat surface and a threaded shaft which is threadedly coupled to said threaded bore of one of said arms of said yoke wherein each of said caps is axially aligned with one of said trunnions and wherein each of said caps engages said outer race of one of said bearing assemblies to secure said outer race whereby said inner gimbal ring of said gimbal is pivotally coupled to said arms of said yoke about said second axis; and
   m. a handle rotatively coupled to said yoke about a third axis which is the tilt axis and detachably coupled to the support apparatus whereby said first, second and third axes are orthogonal and intersect each other at a common point and whereby a cameraman can adequately control angular deviations of the combined sled and camera along the axes of pan, roll and tilt during hand-held motion picture photography.

* * * * *